Nov. 22, 1966  J. W. WILSON  3,286,332
TOOL FOR USE IN ASSEMBLING CONDUITS AND END FITTINGS
Filed Feb. 23, 1965
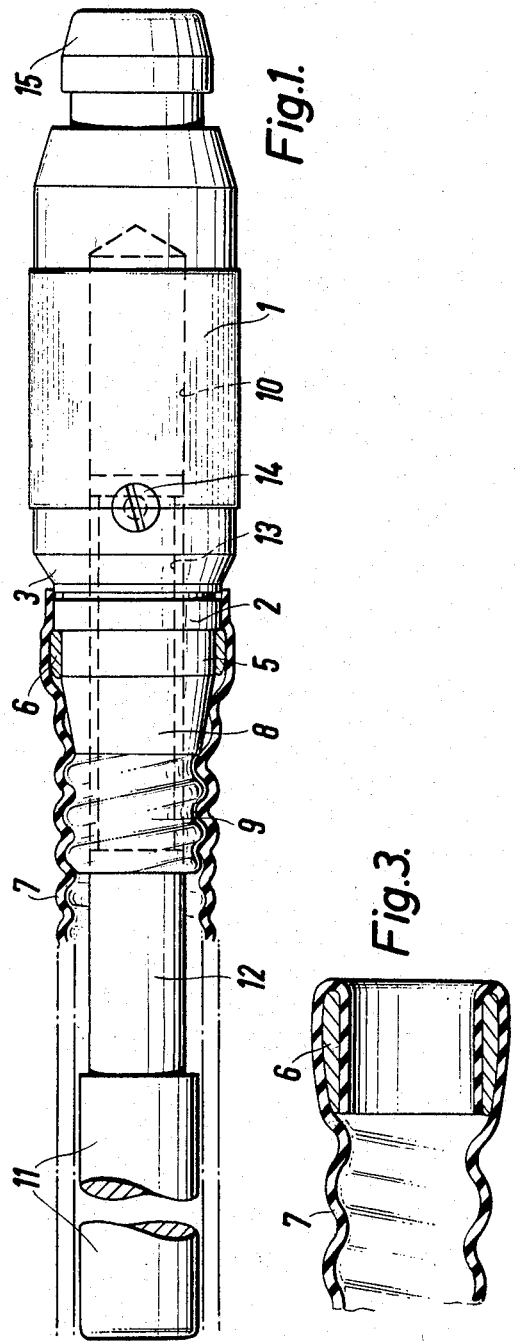
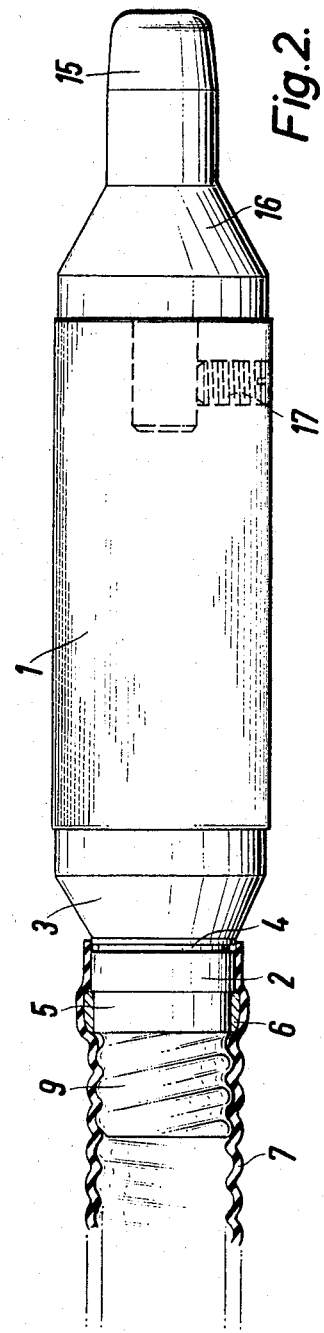
INVENTOR
John William Wilson
BY Dean, Fairbanks v Hirsch
ATTORNEYS United States Patent Office 3,286,332
Patented Nov. 22, 1966

3,286,332
TOOL FOR USE IN ASSEMBLING CONDUITS
AND END FITTINGS
John William Wilson, Slough, England, assignor to
Superflexit Limited, Slough, England
Filed Feb. 23, 1965, Ser. No. 434,712
Claims priority, application Great Britain, July 23, 1964,
29,683/64
4 Claims. (Cl. 29—243.52)

The tool forming the subject of the present invention has been designed to facilitate the insertion of a ring or sleeve into the end of an internally and externally helically convoluted flexible conduit, the ring or sleeve having a diameter such that it could not be inserted without expansion of the conduit at its end. The ring or sleeve forms virtually a part of a conduit end fitting for example an end fitting of the kind forming the subject of co-pending British patent application No. 27,970/64, the end of the conduit being turned inwardly to form an inwardly directed cuff within which the ring or sleeve is located.

The tool therefore has been designed to expand the conduit at its end to receive the sleeve, to insert the ring or sleeve in its correct position in the conduit and also preferably to form the inwardly turned edge of the conduit neatly around the edge of the ring or sleeve as an inwardly turned cuff.

Referring to the accompanying drawings:

FIGURES 1 and 2 illustrate two alternative forms of tool in accordance with the invention in use.

FIGURE 3 is a section drawn to an enlarged scale showing the inserted ring and inwardly turned cuff.

A tool for the purpose specified and in accordance with the present invention comprises a handle portion threaded at one end to screw into the end of the convoluted conduit and a cylindrical part adapted to carry a ring or sleeve for insertion in the conduit near its extremity, the cylindrical part being so positioned in relation to the threaded part that the extremity of the conduit can override the ring or sleeve leaving a part of the conduit projecting beyond the ring or sleeve for subsequently turning inwardly into the ring or sleeve to form an inwardly turned cuff.

Referring in the first case to FIGURE 1, the tool includes an externally knurled cylindrical part 1 intended to be grasped by one hand and a cylindrical part 2, part 1 leading to a tapering part 3 a circumferential groove 4 separating parts 2 and 3 for a purpose hereinafter referred to.

A second cylindrical part 5 is provided of smaller diameter on which the ring or sleeve 6 which is to be inserted in the conduit 7 is mounted, the conduit being internally and externally helically convoluted.

The cylindrical part 5 leads to a tapering part 8 and finally to an externally threaded part 9 having the same pitch as the convolutions of the conduit.

The tool is bored axially at 10 to receive a telescopic extension including a handle portion 11 which is grasped by the other hand through the conduit, the handle portion being carried by a reduced diameter part 12 having the same diameter as the boring 10.

The part 12 is further reduced in diameter for a part of its length as at 13 for the entry of the extremity of a grub screw 14 permitting a limited telescopic movement.

The part 1 has a specially shaped extremity 15 for a purpose hereinafter referred to.

In use the ring or sleeve 6 is placed on the cylindrical part 5 and the tool fully extended. The handle portion 11 is then inserted in the end of the conduit, the handle portion 1 being grasped by one hand. The end of the conduit may if desired be first expanded by introducing the end 15 into the end of the conduit.

The handle portion 11 is then grasped by the other hand through the conduit and the parts of the tool telescoped together so that the end of the conduit engages the endmost thread of the part 9. The parts of the tool are then relatively rotated in the appropriate direction so that the end of the conduit rides up the part 9 and then up the tapered part 8 which expands the end of the conduit, the latter then passing easily over the ring 6 and over the cylindrical part 2. The ring may be externally chamfered as shown so that the end of the conduit will ride easily over the outer surface of the ring.

Preferably the extremity of the conduit projects slightly beyond the groove 4, the end of the conduit being cut off square by a knife or other cutting instrument cutting through the wall of the conduit into the groove.

The conduit with inserted ring or sleeve is then removed from the tool and the free end of the conduit projecting beyond the ring or sleeve, turned inwardly around the edge of the ring or sleeve to form an inwardly directed cuff as shown in FIGURE 3.

The cuff can then be accurately formed by inserting the tapered end 15 of the tool into the cuff and rotating it so that the cuff accurately engages and lies truly concentric with the inner surface of the ring or sleeve, the conduit being then ready for the attachment of the remaining parts of the end fitting.

A simpler and less expensive tool is illustrated in FIGURE 2. In this case the tool is not telescopic but retains the other features of the construction shown in FIGURE 1, except for the omission of the tapering part 8 leading to the ring carrying part.

The tool in this case is fitted with a separately formed end piece 16, the extremity of which is shaped as at 15 in FIGURE 1 but of smaller diameter, the part being used to press the end of the conduit into the ring so that it assumes the cuff like formation. The part 16 is preferably composed of Tufnol, a synthetic resin, and is secured in position by means of a grub screw 17 engaging a spigot on the end of the part 16 which enters a blind boring in the handle portion 1. In this case the part of the tool is merely screwed into the end of the conduit until the extremity of the conduit rides over the ring into the position shown.

It will be appreciated that in both constructions the length of the part 2 will determine the width of the cuff.

The end fitting usually includes a nipple which enters the cuff, a shouldered ferrule which surrounds the end of the conduit so that the conduit and ring or sleeve are gripped between the nipple and ferrule to locate the parts firmly in position, and an internally threaded and shouldered sleeve nut which by its threaded engagement with the body of the end fitting draws the parts into firm interengagement.

The particular type of conduit with which the invention is primarily concerned is formed from a plastic material such as polyvinylchloride or from one of the fluorocarbon products, such as polytetrafluoroethylene, a polyamide or from a synthetic or natural rubber.

I claim:

1. A tool to facilitate the insertion of a sleeve into the end of an internally helically convoluted flexible conduit, said tool having a main part comprising an externally threaded extremity for entry into the end of the helically convoluted flexible conduit, the main part including a cylindrical part of diameter slightly less than that of the sleeve which is to be inserted into the conduit, a second cylindrical part adjacent the first cylindrical part and of larger diameter than the first cylindrical part to form an intermediate shoulder against which the sleeve can abut and having a predetermined width, the edge of the second cylindrical part remote from the first cylindrical part providing a guide to enable the unwanted extremity of the conduit to be cut off leaving a determined length of conduit projecting beyond the sleeve for subsequently turning inwardly into the sleeve to form an inwardly turned cuff after the conduit and its contained sleeve have been removed from the tool, the main part including a handle portion which can be grasped by one hand when introducing the main part into the end of the conduit leaving the other hand free to grasp the conduit, whereby when the main part is screwed into the end of the conduit, such end will ride over and encompass the sleeve.

2. A tool as claimed in claim 1, wherein an annular groove is formed in the periphery of the main part adjacent the edge of the second cylindrical part remote from the shoulder to facilitate cutting off the unwanted extremity of the conduit accurately adjacent the said edge.

3. A tool as claimed in claim 1 including a tapering part between the threaded extremity and the first cylindrical part to expand the end of the conduit and flatten out the end convolutions preparatory to encompassing the sleeve.

4. A tool as claimed in claim 1 including a reduced diameter separately formed part telescopically connected with the main part and coaxial therewith, the separately formed part projecting from the threaded extremity of the main part and having a diameter such that it will easily enter the conduit whereby the separately formed part can be grasped by one hand through the wall of the conduit and the main part can be grasped by the other hand, to permit the two parts to be relatively rotated and telescoped towards one another to cause the extremity of the conduit to ride up the threaded extremity of the main part and encompass the sleeve.

References Cited by the Examiner

UNITED STATES PATENTS

| | | | |
|---|---|---|---|
| 1,793,454 | 2/1931 | Bengtson | 29—235 |
| 1,835,179 | 12/1931 | Parker | 29—243.52 |
| 2,968,864 | 1/1961 | Lee | 29—235 |

FOREIGN PATENTS

| | | |
|---|---|---|
| 969,890 | 5/1950 | France. |

WILLIAM FELDMAN, *Primary Examiner.*

MILTON S. MEHR, *Examiner.*